INVENTORS
DAVID L. ARENBERG
ALFRED G. EMSLIE
BY
ATTORNEY

United States Patent Office 2,788,520
Patented Apr. 9, 1957

2,788,520

TUNING ASSEMBLY FOR A RADAR SYSTEM

David L. Arenberg, Dorchester, Mass., and Alfred G. Emslie, Altoona, Pa., assignors, by mesne assignments, to the United States of America as represented by the Secretary of the Navy Application April 11, 1946, Serial No. 661,180

4 Claims. (Cl. 343—17.7)

This invention relates to radar systems and more particularly to a tuning assembly for a radar system.

In tuning radar systems it is often desirable to see the transmitted pulse on the radar screen. For this purpose a portion of the transmitted pulse is delayed and made to appear on the screen after being detected and amplified by the receiver. In the past resonant cavities have been used to delay the transmitted signal. These proved unsatisfactory for airborne radar systems due to the weight and space required.

It is an object of the present invention to provide a tuning assembly for a radar system.

Another object of the present invention is to provide a tuning assembly which is light in weight and one which requires little space.

Still another object is to provide a means of delaying the transmitted pulse of a radar system.

A further object is to provide a delay line for the above assembly.

A still further object is to provide a supersonic delay line for the above assembly.

A still further object is to provide an attenuator for the above assembly.

A still further object is to provide an auxiliary mixer for the above assembly to be used in connection with the local oscillator of the radar system to be tuned.

These and other objects will be apparent from the following specification when taken in connection with the accompanying drawing in which.

The transmitted signal from the magnetron of the radar system is first attenuated. The attenuated signal is passed to a mixer which also receives a signal from the local oscillator of the radar system. The output of the mixer is passed through a supersonic delay line to the receiver of the radar system and then through the indicator amplifier to the screen of the cathode ray oscilloscope of the radar system. The signal shows up as a delayed pulse whose waveform may be observed and used in making adjustments of the radar system.

The reason for delaying the detected transmitted pulse is so that it will show up near the center of the time sweep of the cathode ray oscilloscope. It is convenient to observe there and if the detected transmitted pulse is at the beginning of the time sweep it will be superimposed on the portion of the transmitted pulse leaking through the transmit-receive box. Since this latter pulse is uncontrollable in magnitude and since adjustments on the radar system are to be made by observing the magnitude of the detected transmitted pulse this latter condition is undesirable.

Figure 1:
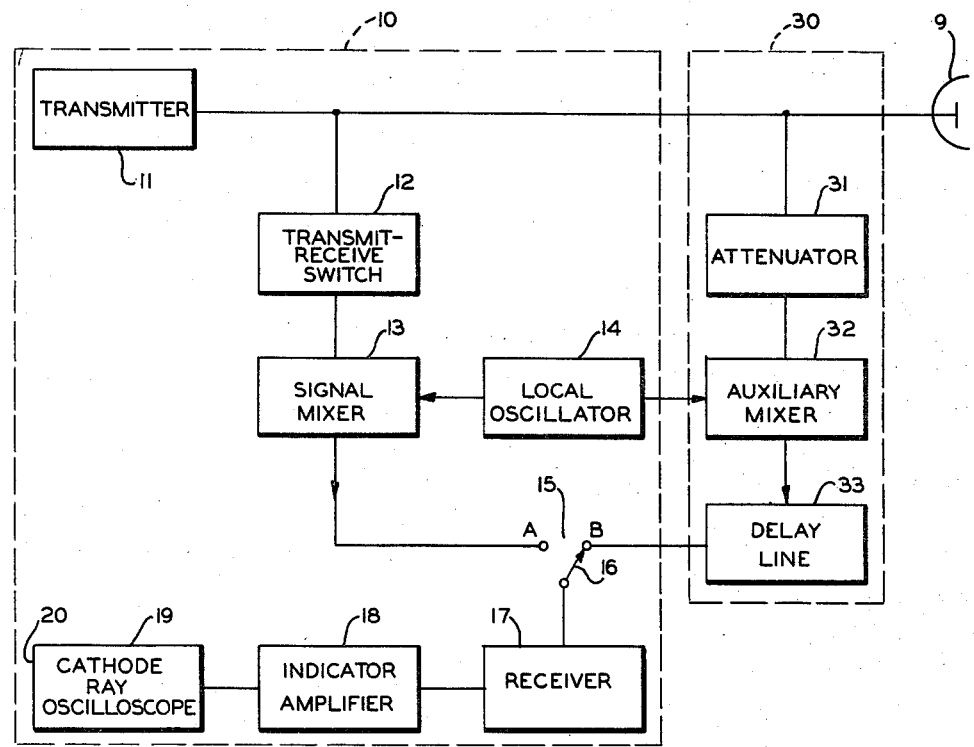
Fig. 1 is a schematic diagram of part of a radar system in combination with one form of the present invention.

Referring now to Fig. 1, all the components in block 10 are part of a conventional radar system. The signal from antenna 9 is passed through transmit-receive box 12 to a signal mixer 13 where it is combined with a signal from local oscillator 14. When the arm 16 of switch 15 is on terminal A then the signal is passed through receiver 17 and indicator amplifier 18 to cathode ray oscilloscope 19 where it appears on screen 20. Block 30 contains one form of the present invention and demonstrates one possible method of connecting it to the radar system. The signal from transmitter 11 passes through attenuator 31 to auxiliary mixer 32 where it is combined with the signal from local oscillator 14. The resultant signal is passed through supersonic delay line 33 to terminal B of switch 15.

Supersonic delay line 33 consists of two crystals separated by a liquid bath. Radio frequency energy applied to one crystal will cause it to vibrate and send supersonic waves through the liquid bath in turn causing the second crystal to vibrate at the same rate as the first crystal. The second crystal therefore will transmit at the same radio frequency as is received by the first crystal. A delay will be introduced due to the time it takes supersonic energy to travel through the liquid bath. When arm 16 of switch 15 is on terminal B, then the delayed signal is passed through receiver 17 and indicator amplifier 18 to screen 20 of cathode ray oscilloscope 19.

A solid delay line would work equally well if used to replace the supersonic delay line 33 and would in no way depart from the spirit and scope of the present invention.

Figure 2:
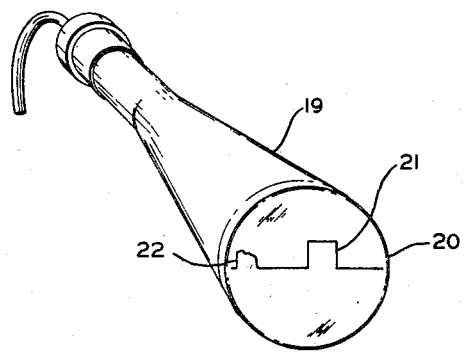
Fig. 2 is a front view of the screen of the cathode ray oscilloscope used in the drawing of Fig. 1.

Referring to Fig. 2, screen 20 is the screen of cathode ray oscilloscope 19 (Fig. 1). Pulse 22 is the pulse from transmitter 11 which has passed through transmit-receive box 12. Pulse 21 is the delayed transmitted pulse appearing when arm 15 of switch (Fig. 1) is on terminal B.

In operation when arm 16 of switch 15 is on terminal A, the radar system of block 10 operates conventionally and the invention as represented in block 30 is inoperative. When arm 16 of switch 15 is on terminal B, then the radar system of block 10 is made inoperative and the invention as represented schematically in block 30 operates as follows. The transmitted pulse is attenuated by attenuator 31 so as not to overload the auxiliary mixer 32. The output from the mixer 32 is then delayed by delay line 33 and after passing through receiver 17, indicator amplifier 18, and cathode ray oscilloscope 19 it appears as pulse 21 on screen 20 (Fig. 2). The delay is introduced into the signal so that pulse 21 is not superimposed on pulse 22 (Fig. 2) which is a portion of the undelayed transmitted pulse leaking through the transmit-receive box 12.

While a particular embodiment of this invention has been disclosed and described, it is to be understood that various changes and modifications may be made therein without departing from the scope thereof as set forth in the appended claims.

What is claimed is:

1. Apparatus for testing a radar system comprising, means for abstracting a small portion of the energy transmitted by said radar system, means for mixing said small portion of energy with energy from the local oscillator of said radar system to provide a difference frequency signal, means for delaying the difference frequency signal derived from said mixing means, and means for simulating an echo signal detected by said radar system by applying said delayed signal to the receiver of said radar system.

2. Apparatus for testing a radar system comprising, means for abstracting a small portion of the energy transmitted by said radar system, means for attenuating said small portion of energy, means for mixing said small portion of energy with energy from the local oscillator of said radar system to provide a difference frequency signal, means for delaying the difference frequency signal derived from said mixing means, and means for simulating an echo signal detected by said radar system by applying said delayed signal to the receiver of said radar system.

3. Apparatus for testing a radar system comprising, means for abstracting a small portion of the energy transmitted by said radar system, means for attenuating said small portion of energy, means for mixing said small portion of energy with energy from the local oscillator of said radar system to provide a difference frequency signal, means for delaying the difference frequency signal derived from said mixing means, switching means for discontinuing the normal operation of said radar system, and means for applying said delayed signals to the receiver of said radar system during the discontinuance of said normal operation.

4. Apparatus for testing a radar system comprising, an attenuator connected to the output transmission line of said radar system, an auxiliary mixer connected to said attenuator and to the local oscillator of said radar system, attenuated energy from said transmission line and from said local oscillator being heterodyned in said auxiliary mixer to provide a difference frequency signal, a delay line connected to said auxiliary mixer and having said difference frequency signal applied thereto, switching means for discontinuing normal operation of said radar system and applying said delayed signals to the receiver of said system to simulate echo signals detected by said radar system.

References Cited in the file of this patent
UNITED STATES PATENTS

| | | |
|---|---|---|
| 2,407,294 | Shockley et al. | Sept. 10, 1946 |
| 2,420,211 | Tourshou | May 6, 1947 |
| 2,421,016 | Deloraine | May 27, 1947 |
| 2,433,681 | Blumlein | Dec. 30, 1947 |
| 2,460,827 | Isely | Feb. 8, 1949 |
| 2,485,583 | Ginzton | Oct. 25, 1949 |
| 2,505,525 | Clapp | Apr. 25, 1950 |
| 2,532,539 | Counter | Dec. 5, 1950 |
| 2,532,546 | Forbes | Dec. 5, 1950 |